Dec. 9, 1969   G. REICHENSPERGER   3,483,341
FLOATABLE SWITCHES
Filed Aug. 4, 1966   2 Sheets-Sheet 1

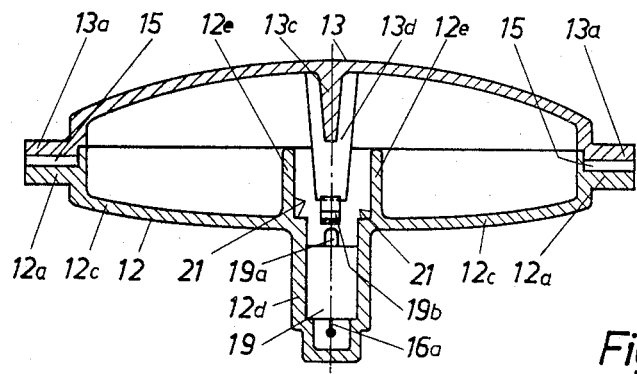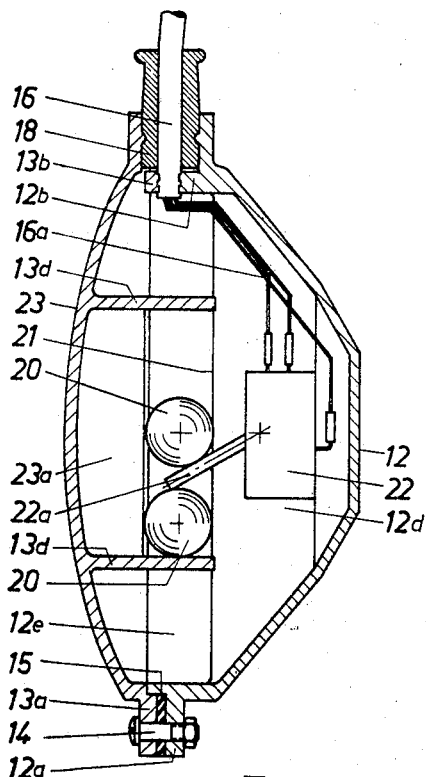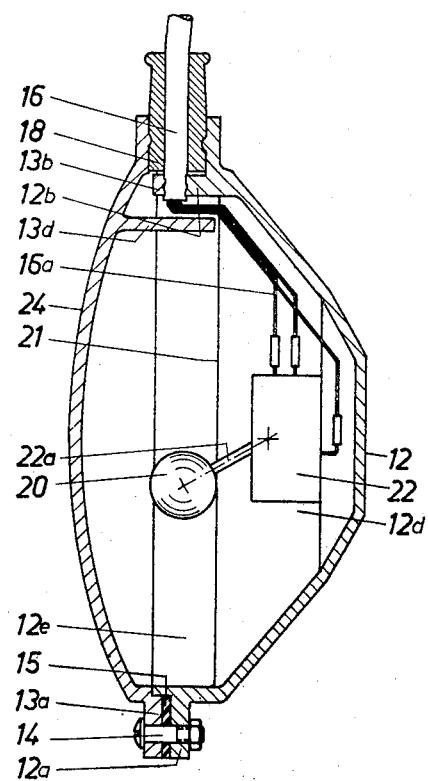

United States Patent Office 3,483,341
Patented Dec. 9, 1969

3,483,341
FLOATABLE SWITCHES
Guenter Reichensperger, 46 Luebbecker Strasse,
Bielefeld, Germany
Filed Aug. 4, 1966, Ser. No. 570,320
Claims priority, application Germany, Aug. 13, 1965,
R 41,322
Int. Cl. H01h 35/18
U.S. Cl. 200—84　　　　　　　　　　　　　　　　8 Claims

ABSTRACT OF THE DISCLOSURE

A floating switch for switching immersion motor pumps or the like on or off is disclosed. The switch assembly includes a housing having a rigid track extending therethrough and a switching mass retained within said track and guided therealong between two stable end positions. An electric switch is positioned within the housing and has a switch lever that extends into the track where it is deflected by the switching mass as it moves between its two stable end positions.

BACKGROUND OF THE INVENTION

Field of the invention

The invention concerns a floating switch suitable for use with immersion motor pumps in which the switch switches on or off depending upon the water level.

Description of the prior art

In hitherto known pumps with floating switching two switches are required, of which a lower switch switches the pump off, whilst an upper switch switches the pump on. Such switching arrangement are costly and hence undesirable.

SUMMARY OF THE INVENTION

According to the present invention there is provided a floating switch suitable for switching pumps, more especially electric immersion pumps, characterised by the feature that with the various liquid levels the switch switches on or off, depending on the liquid level, by being pivotable about a centre of gravity, assisted by a cable secured to the switch, the switch having a displaceable and contact switching device provided for moving the centre of gravity of the switch.

In a preferred embodiment, one or more rolling or sliding weights are provided for shifting the centre of gravity. These weights are preferably formed as spheres and are guided in a guide track traversing the switch.

In its lower position the switch, due to the shifting of weight in a downward direction, switches the pump off. If the liquid rises, then the switch rises with the liquid, first without change of position, until its housing, due to the rising cable, which is fixed at a specific level at a certain distance from the switch, is arrested on one side. The progressive rising float displacement causes the free end of the housing to swing so that the weight shifts in its guide track in the opposite direction and hence switches the pump on.

In such a floating switch embodiment it suffices, contrary to hitherto known floating switches, to have only one floating switch which switches both on and off.

Switching on and off may be obtained at any optional liquid level merely by varying the securing of the suspended cable.

Other alternative embodiments are also provided, in which the centre of gravity shifting weight is so directly connected with an "on" and "off" switch that with a positional change of the weight the switch is switched on or off.

BRIEF DESCRIPTION OF THE DRAWINGS

The invention will be described further, by way of example, with reference to the accompanying drawings, in which:

FIG. 4 is a vertical cross-section through the same floating switch taken on the line I—I in FIG. 2;

FIG. 5 is a longitudinal section through an alternative embodiment of a floating switch in the "off" position; and FIG. 6 is a longitudinal section through a further alternative embodiment of a floating switch in the "off" position.

DESCRIPTION OF THE PREFERRED EMBODIMENTS

Figure 1:
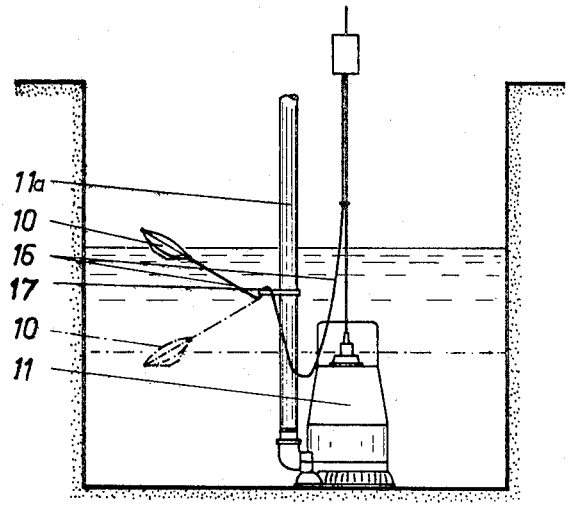
FIG. 1 is a cross-section of an immersion motor pump with floating switch in operational position inserted in a liquid.

A floating switch 10 for an immersion motor pump 11 or the like has a buoyant, preferably two-part housing made of plastics material or the like. The housing parts of the switch comprise a lower part 12 and cover 13 and are detachably secured by means of screws 14, rivets or other means. The screws 14 are inserted in edge-side flanges 12a and 13a between which a packing 15 such as a rubber washer or the like is arranged to provide watertight connection of the lower part 12 with the cover 13.

Clamped between the lower part 12 and cover 13 is a socket 18 receiving a cable 16, which, by means of a clamping holder 17 arranged on a riser 11a of the immersion motor pump 11, is retained so as to be continuously variable in length. Two clamping straps 12b, 13b retain the switch-side end of the cable sleeve, whilst the preferably three core cable wires 16a are connected to a switch 19 secured in the lower part 12.

The switch 19 has a switch pin 19a projecting at the top over which a repeatedly bent switch lever 19b of spring steel or the like is pivotally mounted. This switch lever 19b is arranged behind the switch pin 19a resiliently mounted on the cable side, extending to the cable side end of the housing projecting with a tongue or the like bent up at one end into the movement path of a spherical member (switching sphere) 20 actuating the switch 19 (see FIGS. 2–4).

The upper cover 13 is dish-shaped, whilst the lower part 12, which is also substantially dish-shaped, has formed on its base surface 12c a switch chamber 12d, extending on a longitudinal axis, pointing downwardly and having a substantially U-shaped cross-section. This switch chamber 12d is offset again in its lower region and with its inwardly projecting walls forms two supporting surfaces for the switch 19.

The base surface 12c of the lower part on both sides of the switch compartment 12d acts as slide track for the sphere 20 with two-rib-like defining walls 12e extending parallel to one another with constant spacing adjacent the switch compartment 12d form a guide track 21 extending transversely through the floating switch housing. The track is defined in an upwardly direction by a rib 13c formed on the cover 13.

The ball 20 mounted in sliding or rolling engagement in the guide track 21 when at the end of the track is supported against the housing wall or against the rib 13d formed on the cover 13. To retain the ball 20 in these end positions spherical cap-shaped recesses 21a, 21b are formed in the lower sliding track of the guide track 21 (see FIGS. 2 and 3).

With the switch compartment 12d beneath the ball 20 in the guide track 21, the centre of gravity of the housing is so shifted downwards, that the housing floating on a liquid surface always floats with its lower part 12 immersed in the liquid, whilst the cover 13 projects above the liquid surface as shown in FIG. 1; it being impossible for the floating switch to tilt over.

It is within the scope of the invention for the buoyant housing to be differently formed, e.g. as a box with a rectangular cross-section or the like. In this case, however, the centre of gravity of the housing is to be moved as low as possible. The housing parts may alternatively be welded together.

The above described floating switch 10 operates as follows: If the liquid surface in a container or the like is low, i.e., below the horizontal level of a clamping holder 17, then a flexible cable 16 on the end of which the floating switch 10 is arranged, is held by the clamping holder 17 and forming the centre of gravity of this cable 16, then the cable 16 is downwardly inclined at an acute angle. As soon as the liquid level has reached a specific minimum height, the floating switch 10 also tilts downwards substantially forming a pivotal line with the cable 16. The ball 20 in this case leaves the recess 21a and runs along the guide track 21 also diagonally inclined to the opposite end of the guide track where it is again located in a recess 21b and due to centre of gravity shifting tilts the floating switch to a vertical direction. As soon as the ball 20 leaves the switching lever 19b of the switch 19, switching an electric immersion motor 11 on and off, the resilient switching lever 19b springs further into the guide track 21, thus releasing the switching pin 19a which has hitherto been depressed. This resiliently mounted switching pin 19a springs rapidly upwards, breaking a switching contact and hence switching the immersion motor 11 off.

Figures 2, 3:
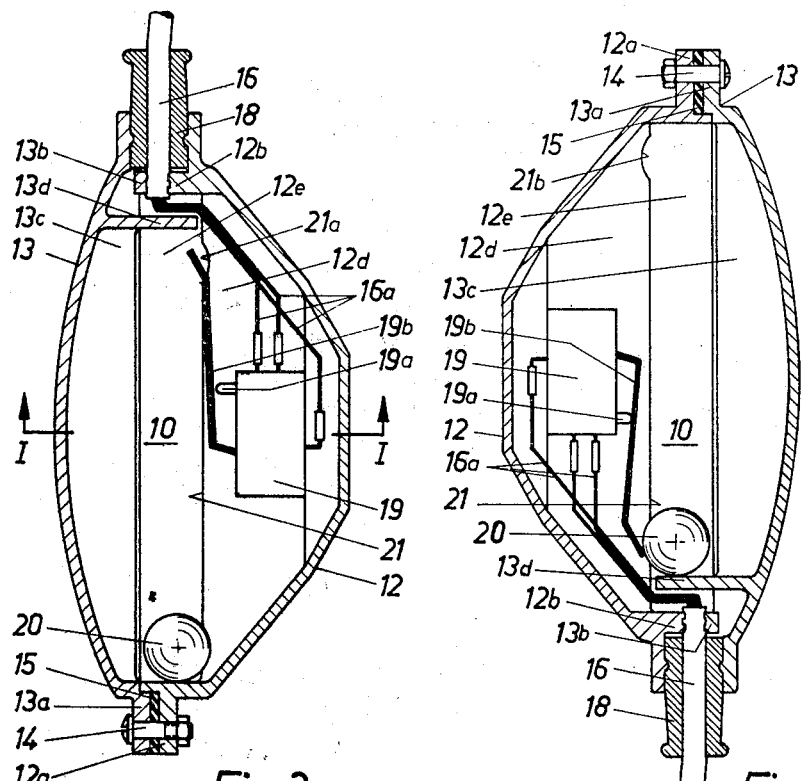
FIG. 2 is a longitudinal section through a floating switch in the "off" position.
FIG. 3 is a longitudinal section through the same floating switch in the "on" position.

The immersion motor 10 is switched on by means of the floating switch 10 in an accordingly reversed sequence when the liquid level rises (see FIGS. 1 and 3).

By varying the length of the cable end between floating switch 10 and clamping holding 17 the height of the liquid level at which the switch operates may be continuously varied.

In an alternative embodiment, illustrated in FIG. 5 two balls 20 arranged in rolling engagement on both sides of a switching lever 22a in a guide track 21, the top of which is defined by a rib 23a of a modified housing cover 23 being formed with two tongues 13d. The lever 22a is adapted to co-operate with a toggle switch 22; thus the ball 20 nearest the cable end switches the toggle 22 on due to shifting of weight, whilst the opposite ball 20 with the corresponding floating switch position, switches it off again.

FIG 6 shows a further alternative embodiment. Herein a ball 20 forming a pendulum switch is secured to the outer end of the switching lever 22a. A further modified housing cover 24 is fashioned without ribs and having only one tongue 13d. If in this case the pendulum switch tilts downwards, i.e., to the end opposite to the cable 16, then it breaks a switching contact and switches the electric immersion motor pump 11 off and in the direction switches it on again.

The floating switch in accordance with the invention is distinguished by its simple method of manufacture and operation. A particular advantage is that only one floating switch is required for switching a pump or the like apparatus on and off. The floating switching in accordance with the invention, provides the advantage that the displaceable weight or weights remain in a given position for long periods hence replacing a holding contact which had hitherto to be provided by a contactor or the like.

I claim:
1. A floating switch for switching pumps, such as electric immersion motor pumps and the like, said switch being adapted to switch the pump on or off in accordance with the varying liquid levels by pivoting about a pivot provided by a flexible electrical cable suspension, comprising:
  (a) a housing adapted for sealed connection to said cable,
  (b) a rigid guide track extending through said housing,
  (c) an electric switch mounted within said housing in the region of said guide track and having a switch lever projecting into said guide track, and
  (d) at least one switching mass retained within said guide track and forcibly guided therealong by gravity between two stable end positions thereby causing a shift in the center of gravity of the floating switch, said at least one switching mass causing said switch lever to be deflected in a first position when said mass is in one of said two stable end positions.

2. A floating switch as recited in claim 1 wherein the end regions of said guide track are provided with notches to act as stop devices for periodically holding said switching mass.

3. A floating switch as recited in claim 1 wherein said housing is formed of two sealably connectable parts and wherein said guide track is formed by two parallel side walls retained with a clearance relative to one another in one of said parts, and a top limiting rib parallel to and positioned between said side walls retained within said other part.

4. A floating switch as recited in claim 3 wherein said other part is further provided with at least a second rib that projects into and limits said track at least the cable side of the floating switch.

5. A floating switch as recited in claim 1 wherein said switching mass is a ball which rolls or slides in said track.

6. A floating switch as recited in claim 1 comprising two switching masses in said track on either side of said switch lever which alternately deflect said switch lever between said first position and a second position.

7. A floating switch as recited in claim 1 wherein said switching mass is fixedly connected to said switch lever and displaceable in said track to deflect said switch lever between said first position and a second position.

8. A floating switch as recited in claim 1 wherein said switch lever is mechanically biased in a second position when said switching mass is in the other of said two stable end positions and said switching mass overcomes the mechanical bias to deflect said switch lever to said first position when in said one of said two stable end positions.

References Cited

UNITED STATES PATENTS

| | | | |
|---|---|---|---|
| 2,600,659 | 6/1952 | Koch | 219—84.2 |
| 3,309,687 | 3/1967 | Phipps | 219—84 |

BERNARD A. GILHEANY, Primary Examiner

F. E. BELL, Assistant Examiner